(12) United States Patent
Lee

(10) Patent No.: US 8,837,914 B2
(45) Date of Patent: Sep. 16, 2014

(54) DIGITAL MULTIMEDIA PLAYBACK METHOD AND APPARATUS

(75) Inventor: Do-kyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1762 days.

(21) Appl. No.: 11/603,837

(22) Filed: Nov. 24, 2006

(65) Prior Publication Data
US 2007/0124780 A1 May 31, 2007

(30) Foreign Application Priority Data

Nov. 30, 2005 (KR) .................. 10-2005-0115844

(51) Int. Cl.
| | | |
|---|---|---|
| H04N 5/93 | (2006.01) | |
| H04N 5/445 | (2011.01) | |
| H04N 21/422 | (2011.01) | |
| G11B 19/02 | (2006.01) | |
| H04N 21/6587 | (2011.01) | |
| H04N 9/804 | (2006.01) | |
| H04N 21/436 | (2011.01) | |
| H04N 5/765 | (2006.01) | |
| H04N 5/783 | (2006.01) | |
| H04N 9/79 | (2006.01) | |
| H04N 5/85 | (2006.01) | |
| H04N 5/775 | (2006.01) | |
| H04N 5/907 | (2006.01) | |

(52) U.S. Cl.
CPC ....... *H04N 5/44543* (2013.01); *H04N 5/44591* (2013.01); *H04N 21/42204* (2013.01); *G11B 19/025* (2013.01); *H04N 5/765* (2013.01); *H04N 5/783* (2013.01); *H04N 9/7921* (2013.01); *H04N 5/85* (2013.01); *H04N 21/6587* (2013.01); *H04N 5/775* (2013.01); *H04N 9/8042* (2013.01); *H04N 9/8047* (2013.01); *H04N 21/43615* (2013.01); *H04N 5/907* (2013.01); *G11B 19/027* (2013.01)
USPC .......................................... 386/282

(58) Field of Classification Search
CPC ................ H04N 21/42204; H04N 21/43615; H04N 21/6587; H04N 5/543
USPC ............. 725/88–89, 134, 142, 133, 141, 153, 725/37–61; 348/553, 563
See application file for complete search history.

(56) References Cited

U.S. PATENT DOCUMENTS 5,796,429 A * 8/1998 Suzuki et al. ............... 348/239
7,802,190 B2 * 9/2010 Uchida et al. ............... 715/737

(Continued)

FOREIGN PATENT DOCUMENTS

| JP | 2004-336762 A | 11/2004 |
|---|---|---|
| KR | 1999-48835 | 7/1999 |
| KR | 2000-32949 | 6/2000 |

OTHER PUBLICATIONS

Office Action issued in Korean Patent Application No. 2005-115844 on Nov. 9, 2006.

*Primary Examiner* — Huy T Nguyen
(74) *Attorney, Agent, or Firm* — Jefferson IP Law, LLP

(57) ABSTRACT

A digital multimedia playback method and apparatus is provided, in which a user interface is used for allowing a user to conveniently play various multimedia contents. The digital multimedia playback method includes navigating contents stored in an external device connected to a digital multimedia playback apparatus through a communication line and providing a list of the found contents through a user interface, playing first found contents that have been first found among the found contents, analyzing a user input signal input through the user interface, and controlling playback, providing an additional function, or stopping playback and providing a navigation screen based on the analyzed user input signal. When a playback stop signal is consecutively input through the user interface, a message requesting removal of the communication line is displayed on the user interface.

16 Claims, 14 Drawing Sheets

(56) References Cited

U.S. PATENT DOCUMENTS

| | | | |
|---|---|---|---|
| 2003/0011641 A1* | 1/2003 | Totman et al. | 345/810 |
| 2004/0179810 A1* | 9/2004 | Haussmann et al. | 386/46 |
| 2004/0187157 A1* | 9/2004 | Chong et al. | 725/86 |
| 2004/0227779 A1 | 11/2004 | Weber et al. | |
| 2005/0041960 A1* | 2/2005 | Oh | 386/125 |
| 2005/0091597 A1 | 4/2005 | Ackley | |
| 2005/0201737 A1* | 9/2005 | Choi | 386/96 |
| 2006/0222340 A1* | 10/2006 | Yamauchi et al. | 386/95 |

* cited by examiner

DVD INFORMATION DISPLAY

| Icon | Label | Description |
|---|---|---|
| DVD | DVD DISC | DVD BEING PLAYED |
| | TITLE | CURRENTLY PLAYED TITLE/ALL TITLES |
| | GROUP | CURRENTLY PLAYED GROUP/ALL GROUP |
| | CHAPTER | CURRENTLY PLAYED CHAPTER/ALL CHAPTERS |
| | TIME | INDICATE ELAPSED TIME WITH TIME: MINUTE: SECOND |
| | ANGLE | CURRENT ANGLE/ALL ANGLES |
| | TRACK (FILE) | CURRENTLY PLAYED TRACK(FILE)/ALL TRACKS(FILES) |
| | AUDIO LANGUAGE | SET AUDIO OF CURRENTLY PLAYED DISC |
| DOLBY DIGITAL | DOLBY DIGITAL | DOLBY DIGITAL DISC BEING PLAYED |
| | DTS DISC | DTS DISC BEING PLAYED |
| | LR STEREO | STEREO BEING PLAYED |
| | SUBTITLE LANGUAGE | SET SUBTITLE OF CURRENTLY PLAYED DISC |
| | REPEAT PLAYBACK | INDICATE REPEAT PLAYBACK IS APPLIED |

VCD/CD/SACD INFORMATION DISPLAY

| Icon | Label | Description |
|---|---|---|
| VCD | VCD DISK | VCD BEING PLAYED |
| CD | CD DISK | CD BEING PLAYED |
| | TRACK (FILE) | CURRENTLY PLAYED TRACK(FILE)/ ALL TRACKS(FILES) |
| | LR STEREO | STEREO BEING PLAYED |
| | SACD | 2CH/MCH(Multi)BEING PLAYED |
| | REPEAT PLAYBACK | INDICATE REPEAT PLAYBACK IS APPLIED |
| | TIME | INDICATE ELAPSED TIME WITH TIME: MINUTE: SECOND |

MP3-CD/JPEG/DivX INFORMATION DISPLAY

| Icon | Label | Description |
|---|---|---|
| MP3 | MP3 DISC | MP3 BEING PLAYED |
| | TRACK (FILE) | CURRENTLY PLAYED TRACK(FILE)/ ALL TRACKS(FILES) |
| DivX | DivX DISK | DivX BEING PLAYED |
| | TIME | INDICATE ELAPSED TIME WITH TIME: MINUTE: SECOND |
| | REPEAT PLAYBACK | INDICATE REPEAT PLAYBACK IS APPLIED |

DIGITAL MULTIMEDIA PLAYBACK METHOD AND APPARATUS

CROSS-REFERENCE TO RELATED APPLICATIONS

This application claims all benefits accruing under 35 U.S.C. §119 from Korean Patent Application No. 2005-115844, filed on Nov. 30, 2005, in the Korean Intellectual Property Office, the disclosure of which is incorporated herein by reference.

BACKGROUND OF THE INVENTION

1. Field of the Invention

The present invention relates to a digital multimedia playback apparatus, and more particularly, to a digital multimedia playback method and apparatus in which a user interface is provided for allowing a user to conveniently play various multimedia content.

2. Related Art

A home theater refers to a system of audio and video components working together to recreate the sights and sounds of a movie theater experience at home. Home theater systems include a digital display device, such as a projector, a projection, a plasma display panel (PDP), or a liquid crystal display (LCD); a digital video disc (DVD) player having an amplification unit to support "5.1" channels, which is a term used to describe digital surround sound audio formats, such as digital theater system (DTS) and Dolby formats; and a speaker system connected to the amplification unit of the DVD player to output sounds. As home theater systems become more popular, efforts have been made to introduce new and/or additional functionalities and to allow users to conveniently use different aspects of a home theatre system.

SUMMARY OF THE INVENTION

Several aspects and example embodiments of the present invention provide a digital multimedia playback method and apparatus, in which a user interface is provided for allowing a user to conveniently play various multimedia contents, and in which an external device is connected thereto, via a communication line, in order to play multimedia contents stored in the external device.

Additional aspects and/or advantages of the invention will be set forth in part in the description which follows and, in part, will be obvious from the description, or may be learned by practice of the invention.

In accordance with an example embodiment of the present invention, there is provided a digital multimedia playback method including: navigating contents stored in an external device connected to a digital multimedia playback apparatus via a communication line and providing a list of the found contents via a user interface, playing first found contents that have been first found among the found contents, analyzing a user input signal input via the user interface, and controlling playback, providing an additional function, or stopping playback and providing a navigation screen based on the analyzed user input signal. When a playback stop signal is consecutively input via the user interface, a message requesting removal of the communication line is displayed on the user interface.

According to an aspect of the present invention, the digital multimedia playback method further comprises: periodically checking if the external device is connected to the digital multimedia playback apparatus via the communication line; and providing a message indicating that the communication line is not sensed via the user interface when the communication line is not sensed.

According to an aspect of the present invention, digital multimedia playback method further comprises: providing via the user interface, content type hot icons for providing lists of the found contents sorted according to content type; and providing a list of the found contents corresponding to one of the content type hot icons selected based on a user selection signal input via the user interface.

According to an aspect of the present invention, the digital multimedia playback method further comprises: sensing if a disc is loaded and decoding contents that have been first read from the disc; when the user input signal is input via the user interface, analyzing the input user input signal; and controlling playback, providing the additional function, or stopping playback based on the analyzed user input signal, wherein, when contents in a moving picture experts group (MPEG) playback format or a digital Internet video express (DivX) playback format are read from the disc, a list of the MPEG playback format or DivX playback format contents stored in the disc is provided via the user interface.

According to an aspect of the present invention, the additional function further comprises at least one of an information display function for checking information during playback, a time display function for checking the total and remaining time of a title or chapter being played, an audio and subtitle language selection function for changing an audio language or a subtitle language during playback, a moving directly to scene/song function for moving directly to a desired title, chapter, time, or track, a segment repeat playback function for repeating playback of a chapter, a title, or a group, a screen enlarge/screen fit function for enlarging a screen or fitting a video to a TV screen, an angle function for viewing the same scene from different angles, and a bonus group function for restricting playback of the disc.

According to an aspect of the present invention, the controlling of the playback comprises providing at least one of a skip forward/backward function for moving to the previous or next chapter, track or scene, a fast playback function for fast playback, a slow playback function for slow playback, and a step function for frame-by-frame playback.

In accordance with another example embodiment of the present invention, there is provided a digital multimedia playback apparatus including a communication line control unit, a disc drive, an external signal reception unit, a decoding unit, a storage unit, an output unit, and a system control unit. The communication line control unit controls an external device connected, via a communication line. The disc drive drives a disc to play multimedia data stored in the disc. The external signal reception unit receives a signal including multimedia contents from the external device connected, via a predetermined cable. The decoding unit decodes the multimedia data received from the communication line control unit, the disc drive, and the external signal reception unit. The storage unit stores system control programs and the multimedia contents decoded by the decoding unit. The output unit outputs the decoded multimedia contents. The system control unit controls the communication line control unit, the disc drive, the external signal reception unit, the decoding unit, and the output unit according to a user input signal. When a playback stop signal is consecutively input via the user interface, the system control unit controls the decoding unit to generate a message requesting removal of the communication line via the output unit.

According to an aspect of the present invention, the system control unit is further configured to control the decoding unit to navigate contents stored in the external device connected via the communication line, to provide a list of the found contents through the user interface, and to play contents that have been first found among the found contents; to control playback, to provide an additional function, or to stop playback and provide a navigation screen based on the analyzed user input signal; and in order to periodically provide information about whether the external device is connected via the communication line, to generate a message indicating that the communication line is not sensed through the output unit if the communication line is not sensed.

According to an aspect of the present invention, the system control unit is further configured to control the decoding unit to provide content type hot icons for providing through the user interface lists of the found contents sorted according to content type and to provide a list of contents corresponding to one of the hot icons selected based on a user selection signal input through the user interface so that the decoding unit outputs a list of the found contents to the output unit.

According to an aspect of the present invention, the communication line control unit comprises a communication line host controller for transmitting data stored in the external device to the decoding unit. The external signal reception unit comprises at least one of an analog-to-digital (A/D) converter for receiving an analog audio signal from the external device connected via the predetermined cable, converting the analog audio signal into a digital audio signal, delivering the digital audio signal to the decoding unit, and controlling signal level and switching during the delivery and a DIR IC for delivering a digital audio signal input through a Sony/Philips Digital Interface (SPDIF) cable to the decoding unit. The output unit comprises at least one of a TV encoder for converting a digital video signal output from the decoding unit into a composite analog signal, delivering the composite analog signal to a television (TV) having no digital input terminal and a high-definition multimedia interface (HDMI) printed circuit board (PCB) unit for converting the digital video signal output from the decoding unit into an HDMI transmission format and transmitting the format converted digital video signal to a TV having an HDMI input terminal.

According to an aspect of the present invention, the system control unit further provides, when providing the additional function, at least one of an information display function for checking information during playback, a time display function for checking the total and remaining time of a title or chapter being played, an audio and subtitle language selection function for changing an audio language or a subtitle language during playback, a moving directly to scene/song function for moving directly to a desired title, chapter, time, or track, a segment repeat playback function for repeating playback of a desired segment, a screen enlarge/screen fit function for enlarging a screen or fitting a video to a TV screen, an angle function for viewing the same scene from different angles, and a bonus group function for restricting playback of the disc.

According to another aspect of the present invention, the system control unit further provides, when controlling playback, at least one of a skip forward/backward function for moving to the previous or next chapter, track or scene, a fast playback function for fast playback, a slow playback function for slow playback, and a step function for frame-by-frame playback.

According to an aspect of the present invention, the system control unit is further configured to control the decoding unit: to sense if a disc is loaded in the disc drive, to decode contents that have been first read from the disc, and to output the decoded contents to the output unit; to analyze the input user input signal and to control playback, to provide the additional function, or to stop playback and provide a navigation screen based on the analyzed user input signal, and when contents in a moving picture experts group (MPEG) playback format or a digital Internet video express (DivX) playback format are read from the disc, to provide a list of the MPEG playback format or DivX playback format contents stored in the disc via the user interface.

In accordance with another example embodiment of the present invention, a method of navigating audio/video (AV) data stored in an optical disc or a recording medium of an external device connected via a universal serial bus (USB) communication line and displaying a list of the found AV data is provided. Such a method comprises: generating icons indicating the types of the AV data; and sorting the AV data corresponding to one of the icons selected based on a user selection signal and displaying a list of the sorted AV data.

According to an aspect of the present invention, icons may indicate the type of the AV data including at least one of a music file icon, an image file icon, a movie file icon, and an all file icon.

In accordance with yet another example embodiment of the present invention, an audio/video (AV) data playback apparatus is provided with a universal serial bus (USB) connection unit arranged to receive AV data stored in a recording medium of an external device connected via a USB communication line; a disc drive to drive a disc so as to play AV data stored in the disc; an external signal reception unit arranged to receive the AV data from the external device connected via a predetermined cable; a decoding unit to decode the AV data received from the USB connection unit, the disc drive, and the external signal reception unit; a signal output unit to output the decoded AV data as an analog signal or a digital signal; and a system control unit arranged to select one of the USB connection unit, the disc drive, and the external signal reception unit as an AV data reception source and perform a control operation to output the decoded AV data as an analog signal or a digital signal.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF EXAMPLE EMBODIMENTS

Figure 1A:
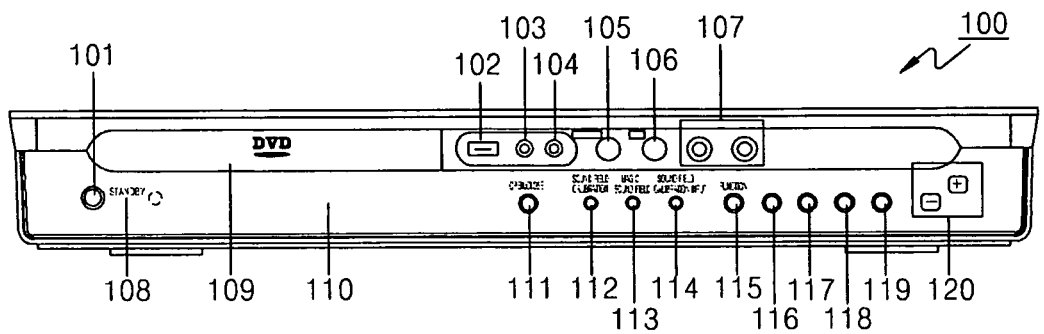
FIGS. 1A and 1B illustrate a front panel and a rear panel of a digital multimedia playback apparatus according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
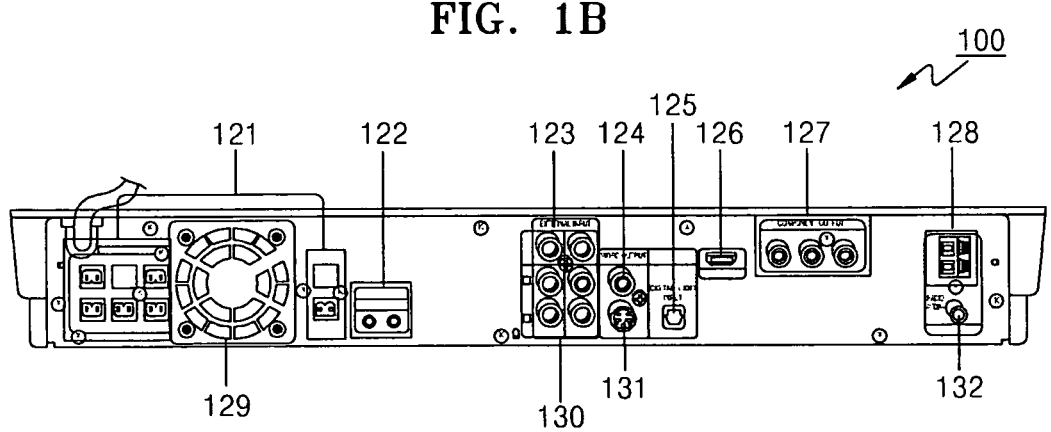

FIGS. 1A and 1B illustrate a front panel and a rear panel of a digital multimedia playback apparatus according to an example embodiment of the present invention. Such a digital multimedia playback apparatus 100 can be, but not limited to, a digital video disc (DVD) home theatre.

As shown in FIG. 1A, the front panel of the digital multimedia playback apparatus 100 includes a power button 101, a universal serial bus (USB) connection terminal 102, a headphone connection terminal 103, a sound field calibration input button 104, a microphone volume controller 105, an echo controller 106, microphone terminals 1 and 2 107, a standby indicator 108, a disc tray 109, a display unit 110, an open/close button 111, a sound field calibration button 112, a magic sound field button 113, a magic headphone button 114, a function button 115, a tuning down/skip button 116, a stop button 117, a play/pause button 118, a tuning up/skip button 119, and a volume control button 120.

As shown in FIG. 1B, the rear panel of the digital multimedia playback apparatus 100 includes speaker output terminals 121, Anynet input/output terminals 122, video input terminals 123, a video output terminal 124, a digital external device audio input terminal 125, an high-definition multimedia interface (HDMI) output terminal 126, chrominance (component) video output terminals 127, an AM antenna connection terminal 128, a cooling fan 129, audio input terminals 130, an S-video output terminal 131, and an FM antenna connection terminal 132.

A right front speaker, a left front speaker, a right rear speaker, a right front speaker, and a sub woofer are connected to the speaker output terminals 121.

The digital multimedia playback apparatus 100 according to an example embodiment of the present invention can be connected to a television (TV), via the video output terminal 123, the S-video output terminal 131, the chrominance (component) video output terminals 127, and the HDMI output terminal 126. If the TV is connected to the video (general) input terminals 123, a general video including black/white (Y) and color (C) signals can be seen. If the TV is connected to the S-video output terminal 131, the black/white (Y) and color (C) signals are separately output to show a video that is clearer than the general video. If the TV is connected to the component video output terminals 127, red ($P_R$), blue ($P_B$), and black/white (Y) signals are separately output to show a clear and sharp video. If the TV is connected to the HDMI video output terminal 126 through an HDMI connection cable, the clearest digital screen can be seen. After a connection is made in this way, a TV mode is selected by pressing a TV/DVD receiver button 319 shown in FIG. 3 and a TV/external input button 321 is pressed to select one of 'External Input', 'S-video', 'Component', and 'HDMI', thereby outputting a video to the TV.

If AnyNet input terminals 122 are connected to AnyNet terminals of the TV providing an AnyNet function, all audio/video (AV) devices included in the home theater can be controlled through a menu screen of the TV using a remote controller for the TV.

Figure 2:
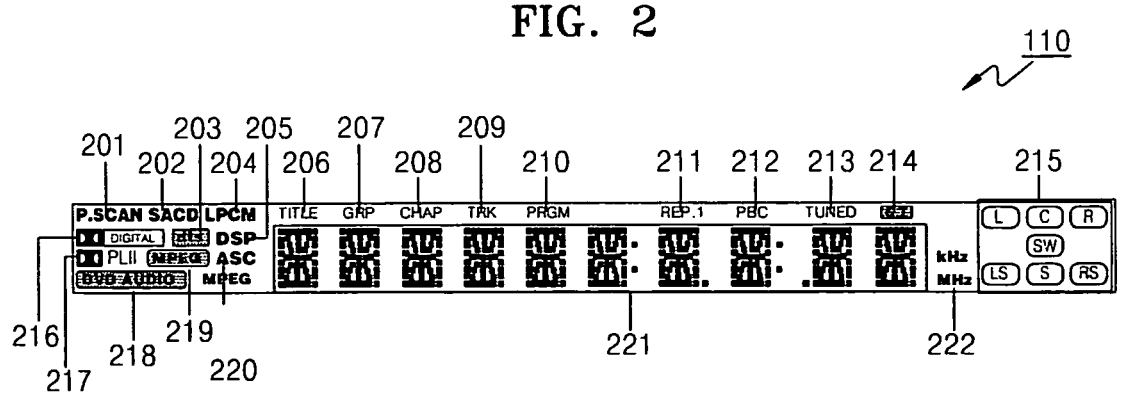
FIG. 2 illustrates a display unit of a digital multimedia playback apparatus according to an example embodiment of the present invention.

For connection to a digital external device, such as a set-top box or a compact disc (CD) recorder, the video output terminal 124 is connected to a video input terminal of the TV, the video input terminals 123 are connected to video output terminals of the digital external device, and a digital output terminal of the digital external device is connected to a digital external device input terminal (OPTICAL) 125. Thereafter, if DIGITAL IN is selected in the display unit 110, as shown in FIG. 2 using an external device button 322 of a remote controller 300, shown in FIG. 3, contents stored in the digital external device can be played. If an analog external device such as a TV or a video player is connected to the digital multimedia playback apparatus, it can be played. If an FM antenna is connected to the FM antenna connection terminal 132, FM radio broadcasting program can be output. If an AM antenna is connected to the AM antenna connection terminal 128, AM radio broadcasting can be output.

FIG. 2 illustrates an example display unit of the digital multimedia playback apparatus according to an embodiment of the present invention. As shown in FIG. 2, the display unit 110 includes a P.SCAN indicator 201, an SACD indicator 202, a DTS disc indicator 203, a linear PCM indicator 204, a DSP sound field indicator 205, a title indicator 206, a group indicator 207, a chapter indicator 208, a track indicator 209, a program indicator 210, a repeat indicator 211, a PBC indicator 212, a radio broadcasting reception indicator 213, a stereo indicator 214, a speaker indicator 215, a Dolby digital indicator 216, a Dolby ProLogic II indicator 217, a DVD audio indicator 218, an MPEG indicator 219, an ASC indicator 220, a system information indicator 221, and a radio frequency indicator 222.

Figure 3:
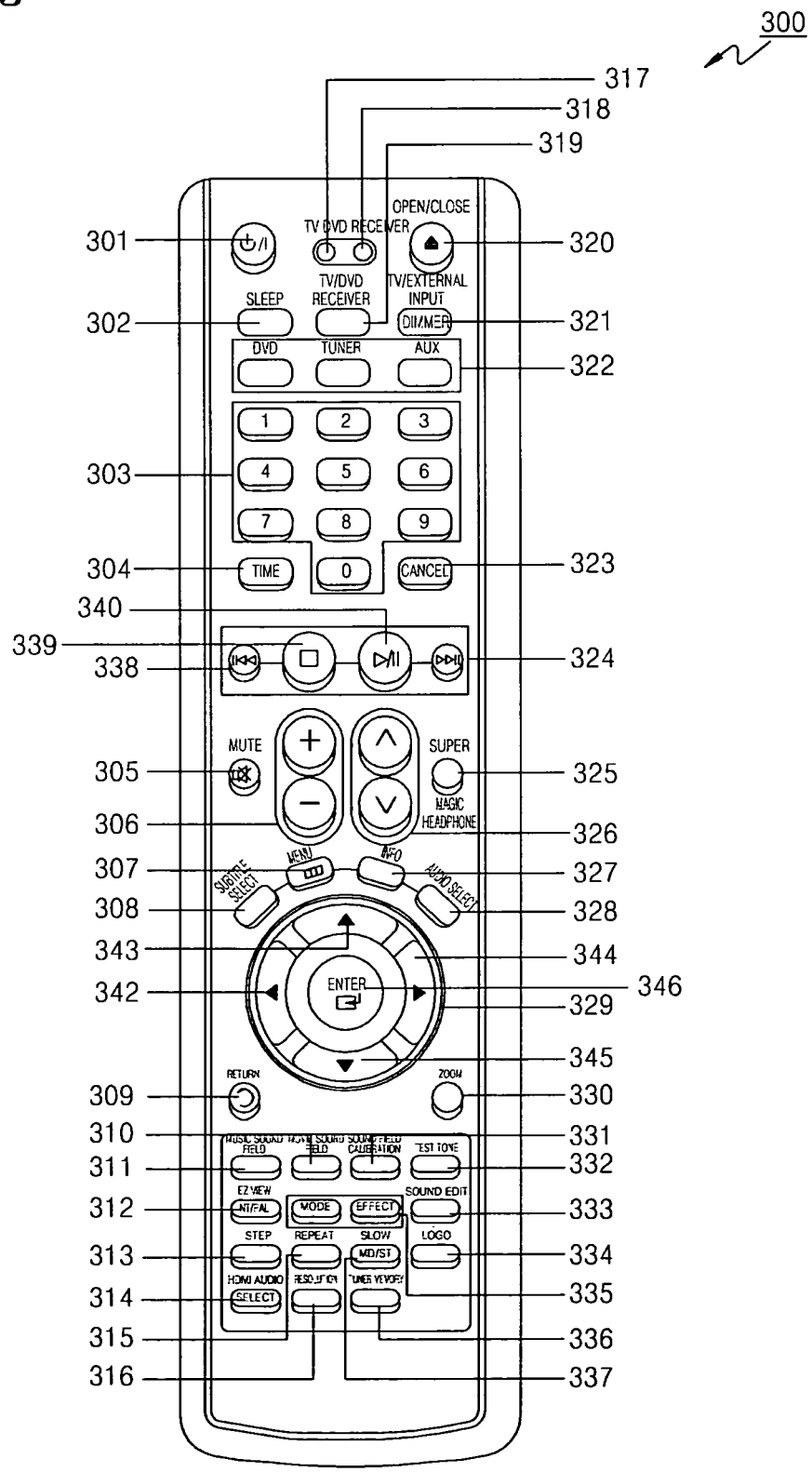
FIG. 3 illustrates buttons of a remote controller for transmitting a user input signal to a digital multimedia playback apparatus according to an example embodiment of the present invention.

FIG. 3 illustrates buttons of the remote controller 300 for transmitting a user input signal to the digital multimedia playback apparatus according to an example embodiment of the present invention. As shown in FIG. 3, the remote controller 300 includes a power button 301, a sleep button 302, number buttons 303, a time display button 304, a mute button 305, volume buttons 306, a menu button 307, a subtitle select, NUPAL button 308, a return button 309, a movie sound field button 310, a music sound field button 311, an EZ VIEW button 312, a step button 313, an HDMI audio select button 314, a repeat button 315, a resolution button 316, a TV indicator 317, a DVD receiver indicator 318, a TV/DVD receiver button 319, an open/close button 320, a TV/external input, dimmer button 321, DVD/tuner/external device buttons 322, a cancel button 323, DVD play related buttons 324, a super, magic headphone button 325, tuning/channel buttons 326, an information display button 327, an audio select button 328, a direction/enter button 329, a zoom button 330, a sound field calibration button 331, a test tone button 332, a sound edit button 333, a logo button 334, PL II mode and PL II effect buttons 335, a tuner memory, DCDi button 336, and a slow, MD/ST button 337.

To operate the TV (not shown) with the remote controller 300 according to an example embodiment of the present invention, the TV/DVD receiver button 319 is used. A user first turns on the TV, presses the TV/DVD receiver button 319, points the remote controller 300 toward the TV, and then enters a code corresponding to the brand of the TV using the number buttons 303 while pressing the power button 301. If the TV is turned on or off, the setting is completed.

If a stop button 339 among the DVD play related buttons 324 is pressed once, the stop position is stored in memory. If a play/pause button 340 among the DVD play related buttons 324 is pressed, playback resumes from the stop position. If the stop button 339 is pressed twice, playback is completely terminated, and if the play/pause button 340 is pressed, playback starts from the beginning. The play/pause button 340 is used to pause or resume playback. The open/close button 320 is used to eject a disc 10, as shown in FIGS. 4A-4C.

Figure 4A:
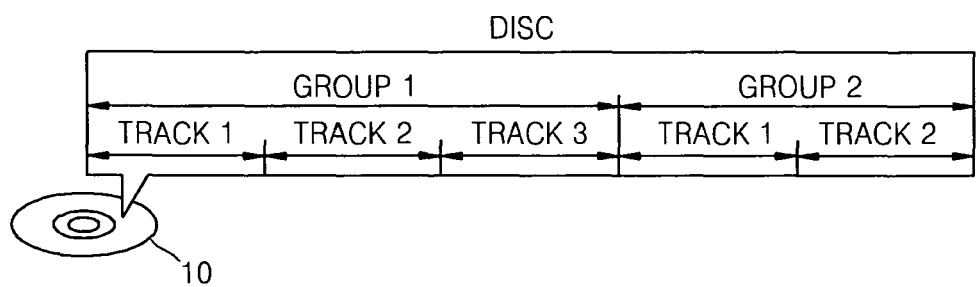
FIGS. 4A through 4C are views for explaining disc terminology used in a digital multimedia playback apparatus according to an example embodiment of the present invention.
Figure 4B:
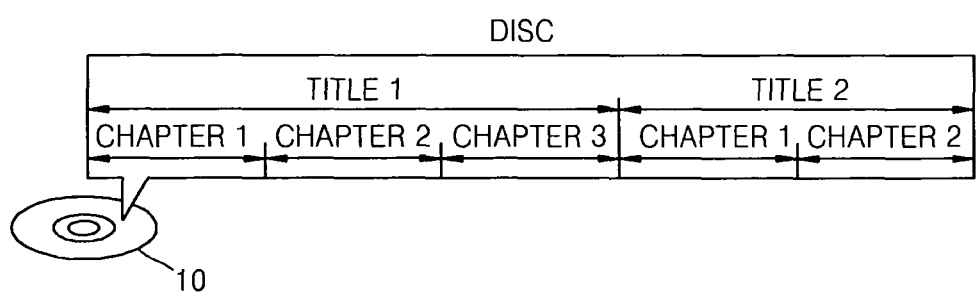
Figure 4C:
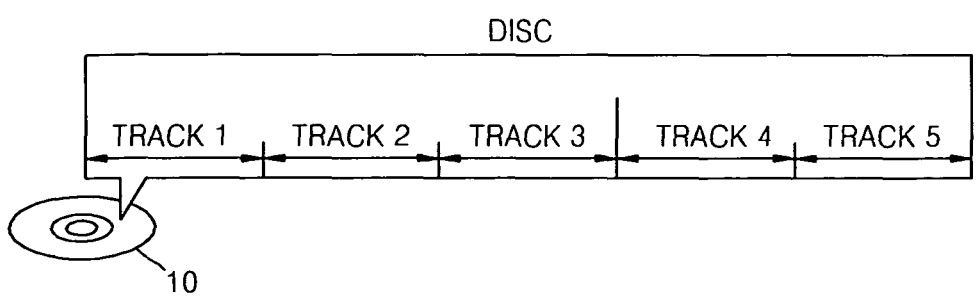

FIGS. 4A-4C are views for explaining disc terminology used in the digital multimedia playback apparatus according to an example embodiment of the present invention.

As shown in FIG. 4A, DVD-audio obtained from a disc 10 is divided into large sections called "groups" and smaller sections called "tracks". Numbers are allotted to these sections. These numbers are called "group numbers" and "track numbers". As shown in FIG. 4B, DVD-video obtained from a disc 10 is divided into large sections called "titles" and smaller sections called "chapters". Numbers are allotted to these sections. These numbers are called "title numbers" and "chapter numbers". As shown in FIG. 4C, SACD, video, and music CDs obtained from a disc 10 are divided into sections called "tracks". Numbers are allotted to these sections. These numbers are called "track numbers".

Hereinafter, a method of using the digital multimedia playback apparatus according to an example embodiment of the present invention will be described with reference to FIGS. 5A-5N. Before using the digital multimedia playback apparatus according to an example embodiment of the present invention, the user presses the TV/DVD receiver button 319, as shown in FIG. 3, to select a TV mode and presses the TV/external input button 321 to select an external input (video or DVD/component). The user then presses the TV/DVD receiver button 319 to select a DVD receiver mode and presses the DVD button 322 to select a DVD mode.

Play control modes will be described in connection with (1) disc playback and (2) navigation and playback at various speeds, and additional function modes will be described in connection with (3) information display through (15) DivX playback.

(1) Disc Playback

In order to allow the digital multimedia playback apparatus according to an example embodiment of the present invention to play a disc 10, as shown, for example, in FIGS. 4A-4C, the user presses the open/close button 320 of the remote controller 300, as shown, for example, in FIG. 3, to open the disc tray 109, as shown, for example, in FIG. 1A. The user places the disc 10 into the tray with the disc's label facing up and closes the compartment by pressing the open/close button 320. Thereafter, playback starts automatically and a different disc menu corresponding to the content of the disc 10 appears.

(2) Navigation and Playback at Various Speeds

To play the previous or next chapter, track, or scene, a button 338 or a button 341 of the remote controller 300, as shown in FIG. 3, is pressed briefly. Each time the button 338 or the button 341 is pressed, the previous or next chapter, track, or scene is played. In the case of a VCD with a track longer than 15 minutes, each time the button 338 or the button 341 is pressed, playback may skip back or forward 5 minutes.

For fast playback, the button 338 or the button 341 is held down during playback. Each time the button 338 or the button 341 is held down during playback, the forward playback speed or reverse playback speed changes in the order of 2×→4×→8×→32×→Normal.

For slow playback, the slow button 337 is pressed. Each time the slow button 337 is pressed, the playback speed changes in the order of ½× slow playback→¼× slow playback→⅛× slow playback→½× reverse slow playback→¼× reverse slow playback→⅛× reverse slow playback→Normal in the case of a DVD, in the order of ½×→¼×→⅙×→Normal in the case of a VCD, and in the order of ½×→¼×→⅛×→Normal in the case of a DivX. For frame-by-frame playback, the step button 313 is pressed. Each time the step button 313 is pressed during playback, the picture moves forward one frame.

(3) Information Display

FIG. 5A illustrates example icons and information for DVD information display, VCD/CD/SACD information display, and MP3-CD/JPEG/DivX information display 500 that can be displayed on the digital multimedia playback apparatus 100 according to an example embodiment of the present invention.

Figure 5B:
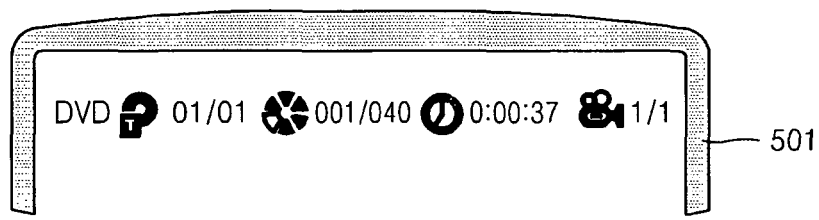
FIGS. 5A through 5N illustrate displayed states of a user interface for explaining a method of using a digital multimedia playback apparatus according to an example embodiment of the present invention.
Figure 5B:
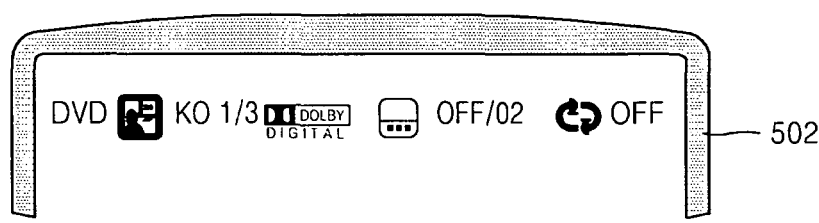

In the case of a DVD, if the information display button 327 of the remote controller 300, as shown in FIG. 3, is pressed once during playback, TITLE, CHAPTER, ELAPSED TIME, and ANGLE appear as shown, for example, on a screen 501 of FIG. 5B. If the information button 327 is pressed once again, AUDIO LANGUAGE (DOLBY DIGITAL or DTS), SUBTITLE, and REPEAT PLAYBACK appear as shown, for example, on a screen 502 of FIG. 5B. If the information display button 327 is pressed once again, the information display disappears.

Figure 5C:
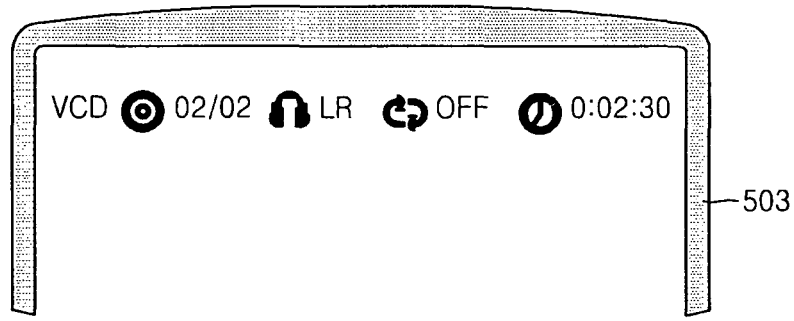

In the case of a VCD or a CD, if the information display button 327 is pressed once during playback, TRACK, STEREO, REPEAT PLAYBACK, and ELAPSED TIME appear as shown, for example, on a screen 503 of FIG. 5C. If the information display button 327 is pressed once again, the information display disappears.

Figure 5D:
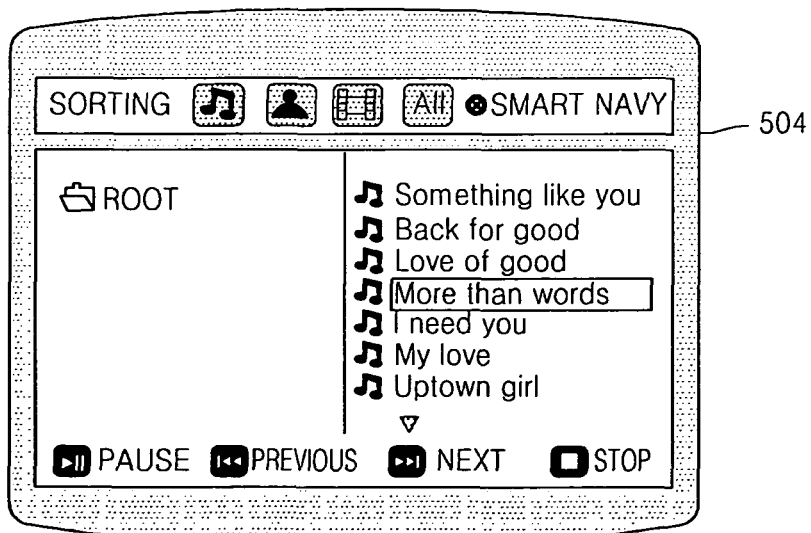

In the case of an MPEG-CD/JPEG, if the information display button 327 is pressed once during playback, TRACK, ELAPSED TIME, and REPEAT PLAYBACK appear as shown, for example, on a screen 504 of FIG. 5D. If the information display button 327 is pressed once again, the information display disappears.

(4) Time Display

If the time display button 304 of the remote controller 300, as shown in FIG. 3, is pressed, the total and remaining time of a title or chapter being played can be checked. In the case of a DVD, each time the time display button 304 is pressed, TITLE ELAPSED→REMAIN: TITLE→CHAPTER ELAPSED→REMAIN: CHAPTER are sequentially displayed in the form of time: minute: second. In the case of a DVD-Audio, each time the time display button 304 is pressed, GROUP ELAPSED→REMAIN: GROUP→TRACK ELAPSED→REMAIN: TRACK are sequentially displayed in the form of time: minute: second. In the case of a SACD, VCD, or CD, each time the time display button 304 is pressed, TRACK ELAPSED→REMAIN: TRACK→TOTAL ELAPSED→REMAIN: TOTAL are sequentially displayed in the form of time: minute: second. The remaining time can also be checked using the information display button 327.

(5) Using Title/Disc Menu

Figure 5E:
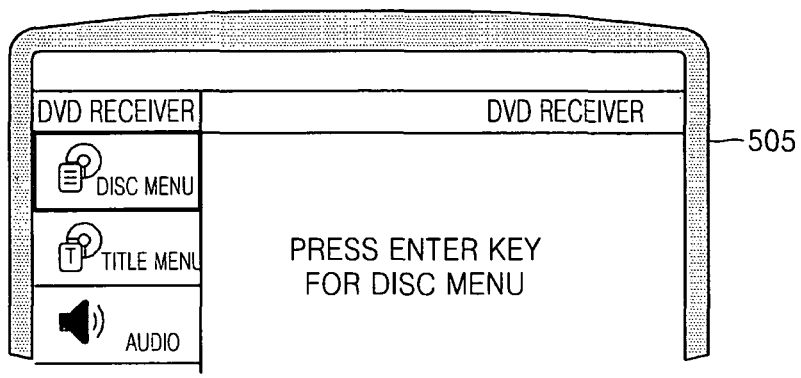

If the menu button 307 of the remote controller 300, as shown in FIG. 3, is used in a stop mode, a setting menu appears as shown, for example, on a screen 505 of FIG. 5E. Up and down cursor buttons 343 and 345 are pressed to move to a disc menu or a title menu and the corresponding menu appears on the screen 505 by pressing the enter button 346.

Menu contents differ from disc to disc. In the case of a disc 10 having the disc menu recorded thereon, the disc menu appears if selected. If the disc 10 does not support the disc menu, a message "This disc does not support the disc menu" appears on the screen 505. In the case of a disc containing multiple titles, the title menu appears if selected. Cursor buttons 342, 343, 344, and 345 are pressed to select a desired item and the enter button 346 is pressed. In the case of a video CD 2.0 disc, a MENU ON/OFF (playback control: PBC) function can be implemented using the menu button 307, and "PBC ON" and "PBC OFF" are repetitively selected on the TV screen 505 each time the menu button 307 is pressed.

(6) Selecting Audio/Subtitle Language

Figure 5F:
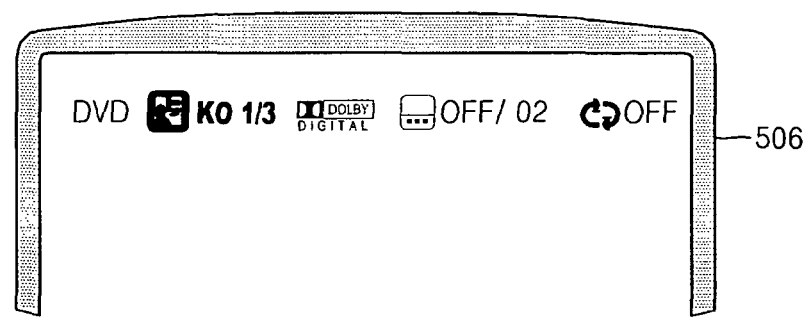

To change an audio language, the information display button 327 of the remote controller 300, as shown in FIG. 3, is pressed twice during playback and the desired audio language is selected using the left and right cursor buttons 342 and 344 as shown, for example, on a screen 506 of FIG. 5F. If 1/1 is displayed, one audio language has been recorded on the disc 10 and thus the audio language cannot be changed to another. After the desired audio language is selected using the up and down cursor buttons 343 and 345 or the number buttons 303, the enter button 346 is pressed. If at least two audio languages are recorded on the disc 10, the disc 10 is played in the selected audio language each time the button is pressed. If the information display button 327 is pressed once again, the information display disappears.

Figure 5G:
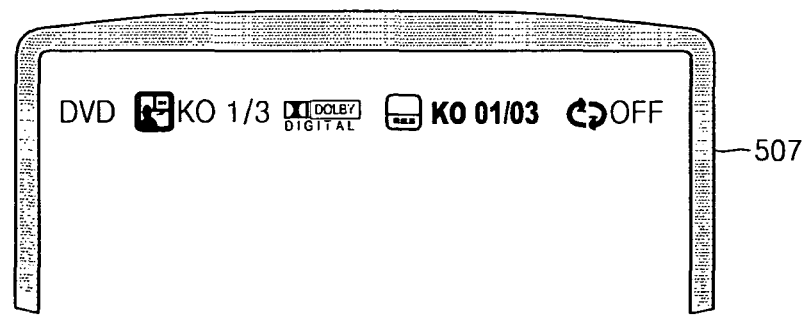

To change a subtitle language, the information display button 327 is pressed twice during playback and the subtitle language is selected using the left and right cursor buttons 342 and 344 as shown, for example on a screen 507 of FIG. 5G. If 01/01 is displayed, one subtitle language has been recorded on the disc 10 and thus the subtitle language cannot be changed to another. After the desired subtitle language is selected using the up and down cursor buttons 343 and 345 or the number buttons 303, the enter button 346 is pressed. If at least two subtitle languages are recorded on the disc 10, the disc 10 is played in the selected subtitle language each time the button is pressed. If OFF is selected, the subtitle disappears. If the information display button 327 is pressed once again, the information display disappears.

(7) Moving Directly to Scene/Song

If the information display button 327 of the remote controller 300, as shown in FIG. 3, is pressed during playback, the information display appears as shown, for example, on the screen 501 of FIG. 5B. The desired title, group, chapter, track, or elapsed time can be selected using the left and right cursor buttons 342 and 344. If the up and down cursor buttons 343 and 345 or the number buttons 303 are pressed to move to the title, chapter, track, or elapsed time display and the enter button 346 is pressed, playback corresponding to the title, chapter, track, or elapsed time is performed. If the information display button 327 is pressed once again, the information display disappears.

(8) Repeat Playback

A chapter, title, group, or track can be repetitively played using the repeat button 315 during disc playback. In the case of a DVD, each time the repeat button 315 is pressed, the repeat playback mode changes in the order of REPEAT: CHAPTER (repeatedly play a currently played DVD chapter)→ REPEAT: TITLE (repeatedly play a currently played DVD title)→REPEAT: OFF (cancel repeat playback). In the case of a DVD-Audio, each time the repeat button 315 is pressed, the repeat playback mode changes in the order of REPEAT: TRACK→REPEAT: GROUP (repeatedly play a currently played DVD-Audio group)→REPEAT: OFF. In the case of a SACD, VCD, or CD, each time the repeat button 315 is pressed, the repeat playback mode changes in the order of REPEAT: TRACK (repeatedly play a currently played SACD, VCD, or CD track)→REPEAT: DISC→REPEAT: OFF. In the case of an MP3-CD or JPEG, each time the repeat button 315 is pressed, the repeat playback mode changes in the order of REPEAT: RANDOM→REPEAT: TRACK (repeatedly play a track or scene in an MP3-CD/JPEG folder)→ REPEAT: FOLDER (repeatedly play all tracks or scenes in an MP3-CD/JPEG folder)→REPEAT: DISC (repeatedly play the entire MP3-CD/JPEG disc)→REPEAT: OFF.

(9) A-B (Segment) Repeat Playback

Figure 5H:
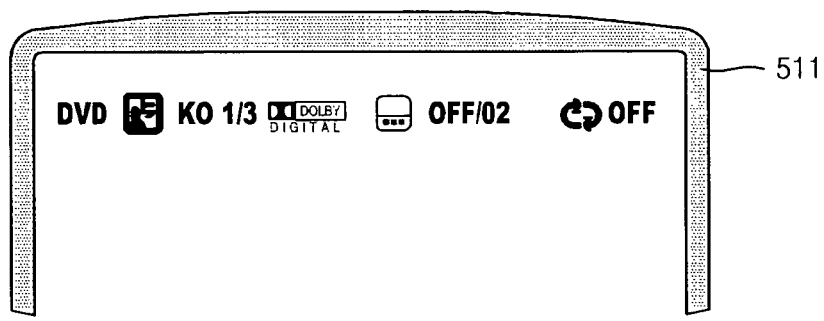
Figure 5H:
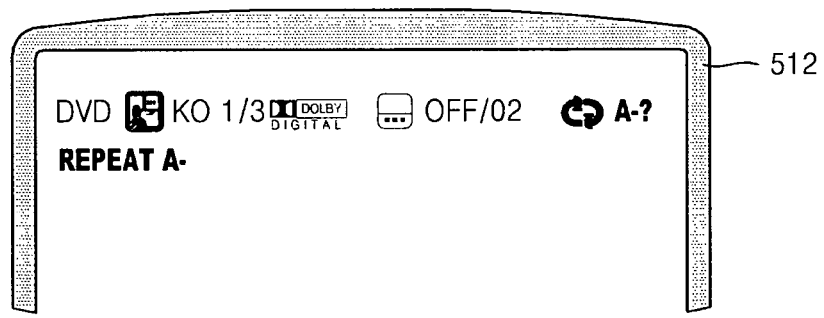
Figure 5H:
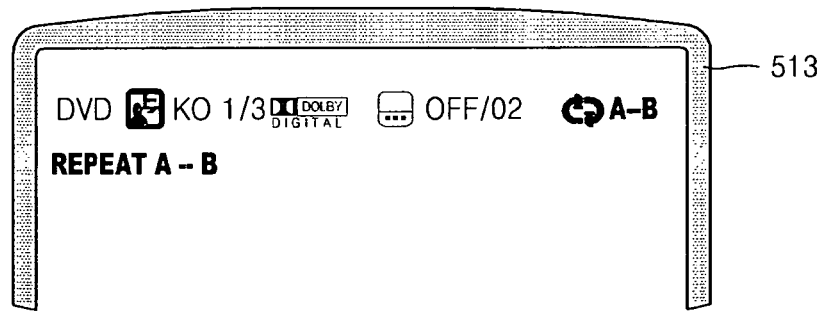

The information display button 327 of the remote controller 300, as shown in FIG. 3, is pressed twice during playback and the left and right cursor buttons 342 and 344 are pressed to move to the repeat playback display, as shown, for example, on a screen 511 of FIG. 5H. The up and down cursor buttons 343 and 345 are pressed to select 'A-' and the enter button 346 is pressed at the beginning of a segment to be repeated. As shown on a screen 512 of FIG. 5H, 'REPEAT A-' appears. If CHAP, TITLE, TRACK, or DISC is selected, a chapter, title, track, or disc can be played repeatedly. If the enter button 346 is pressed at the end of the segment, 'REPEAT A-B' appears as shown on a screen 513 of FIG. 5H and the specified segment is played repeatedly. If the information display button 327 is pressed once again, the information display disappears. To cancel A-B repeat playback, the repeat playback is selected and OFF is selected using the up and down cursor buttons 343 and 345.

(10) Screen Enlarge/Screen Fit Function

Figure 5I:
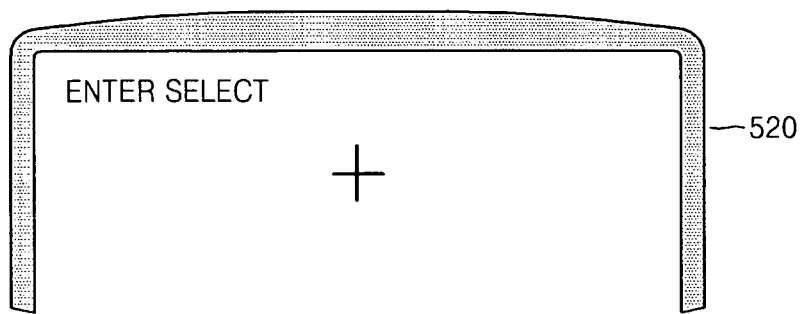

To enlarge a screen with a zoom function, the zoom button 330 of the remote controller 300, as shown in FIG. 3, is pressed during playback or pause. 'Enter Select (+)' appears on a TV screen 520 as shown in FIG. 5I. The cursor buttons 342, 343, 344, and 345 are pressed to move to an area to be enlarged. Each time the enter button 346 is pressed, the zoom level changes in the order of ZOOM×1.5→ZOOM× 2→ZOOM×3→ZOOM OFF.

Figure 5J:
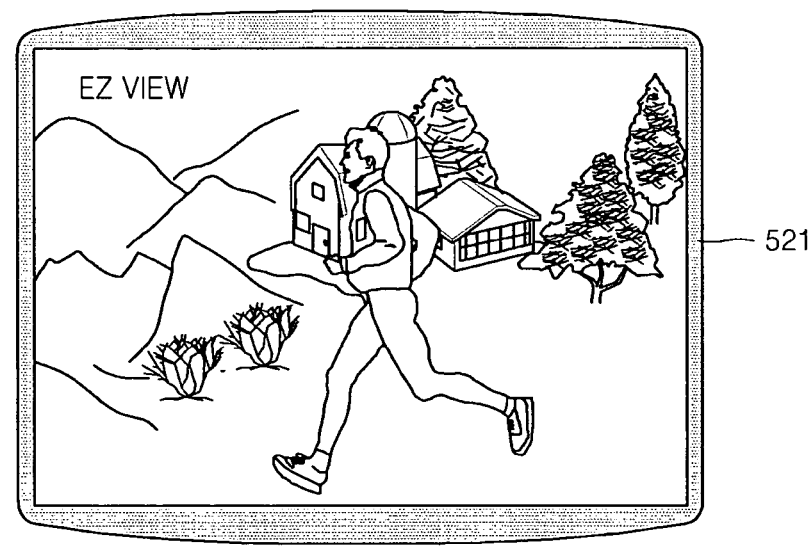
Figure 5J:
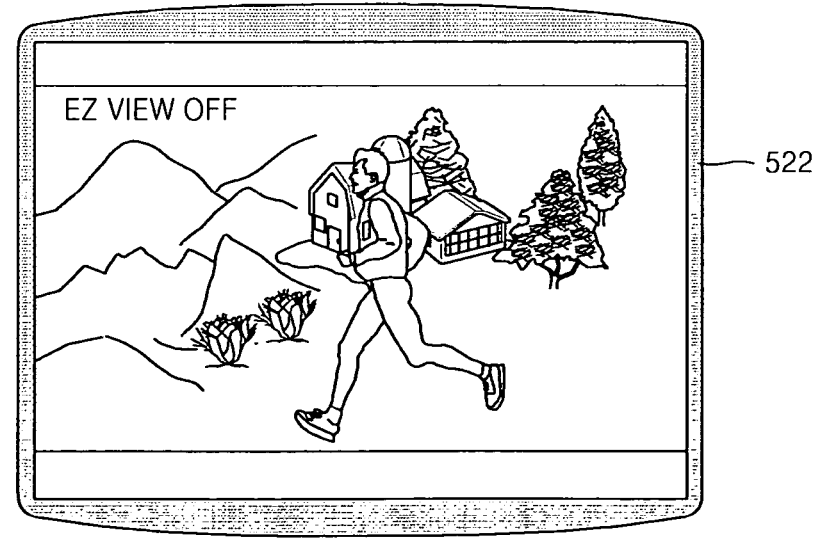

When a movie is played in a widescreen mode, black bars at the top and bottom of the TV screen can be removed by pressing the EZ VIEW button 312. Each time the EZ VIEW button 312 is pressed, the zoom function will switch between EZ VIEW→EZ VIEW OFF as shown, for example, on screens 521 and 522 of FIG. 5J.

(11) Angle Function

Figure 5K:
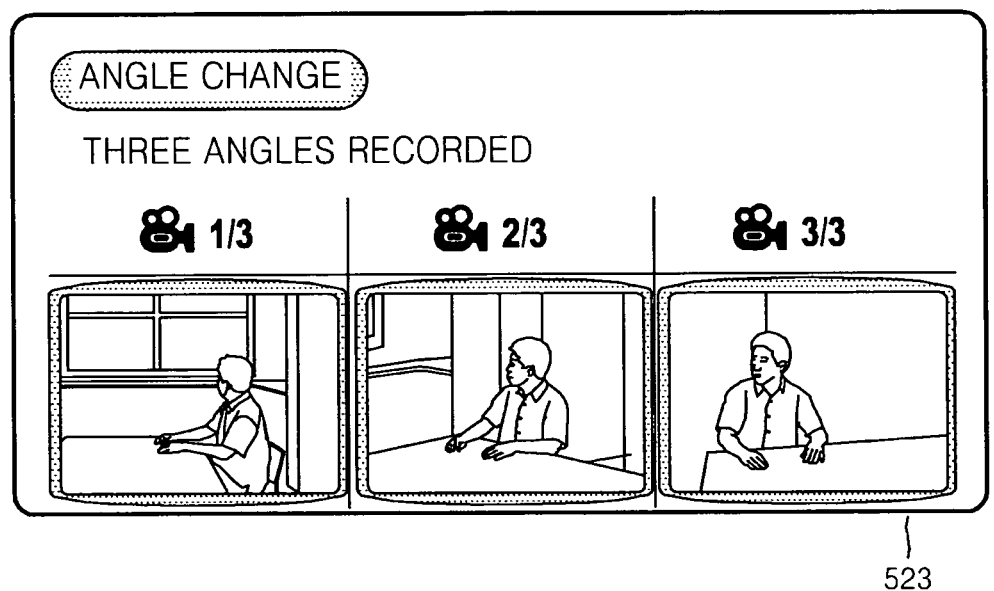

If the information display button 327 of the remote controller 300, as shown in FIG. 3, is pressed during playback, TITLE, CHAPTER, ELAPSED TIME, and ANGLE appear on a TV screen as shown, for example, in FIG. 5B. The left and right cursor buttons 342 and 344 are pressed to select the angle display. If 1/1 is displayed, only one angle has been recorded on the disc and thus the angle cannot be changed to another. Once the desired angle is selected using the up and down cursor buttons 343 and 345 or the number buttons 303, the selected screen 523 is displayed as shown in FIG. 5K.

(12) Bonus Group Function

Figure 5L:
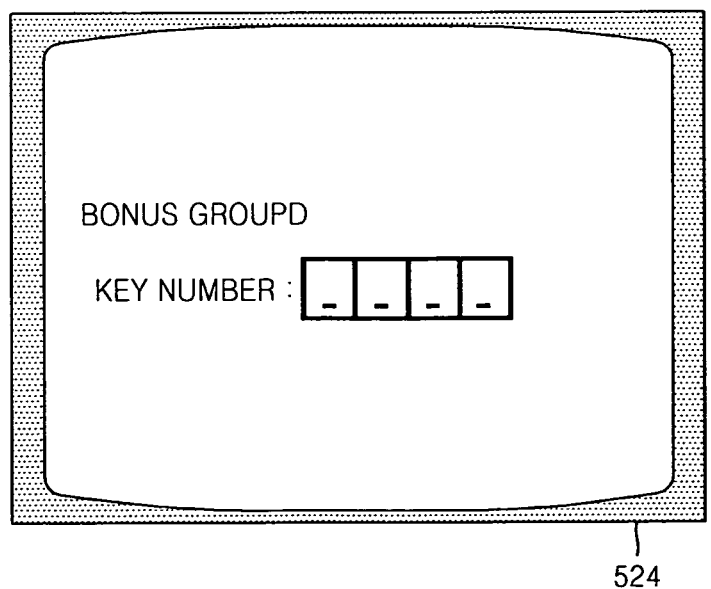

Some DVD-Audio discs have an extra 'bonus' group that requires a number key to access, e.g., a 4-digit key. When a DVD-Audio disc having a bonus group is played, a key number input screen 524 appears automatically as shown, for example, in FIG. 5L. If the tuning/channel buttons 326 are pressed during playback, a desired image can be selected from a DVD-Audio disc containing still images.

(13) Super Audio CD Playback

A super audio CD (SACD) is a disc aimed at providing much higher-quality multi-channel original sound than a conventional music CD, which can be played beyond a human audible range. The digital multimedia playback apparatus according to an example embodiment of the present invention provides an SACD playback function.

Figure 5M:
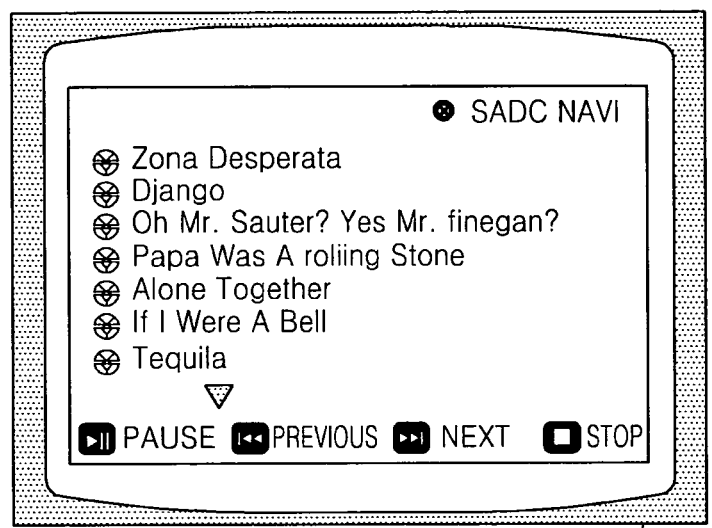
Figure 5N:
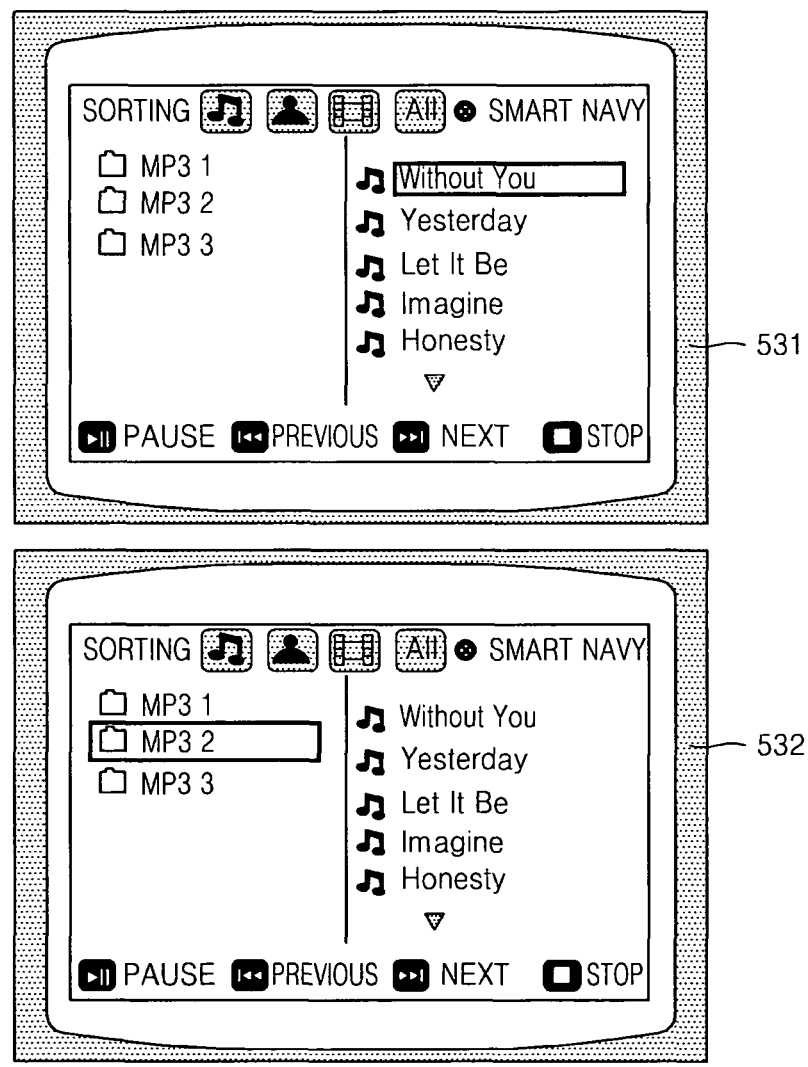

The open/close button 320 is pressed to open the disc tray and the SACD is loaded. Then a SACD menu screen 525 appears as shown, for example, in FIG. 5M and playback starts. If the up and down cursor buttons 343 and 345 are pressed in a stop mode to select a track and the enter button 346 is pressed, the selected track is played. If the stop button 339 is pressed, the playback is stopped.

(14) MP3/JPEG Disc Playback

The digital multimedia playback apparatus according to an example embodiment of the present invention can play a CD (CD-ROM, CD-R, or CD-RW) recorded in an MPEG1 Audio Layer3 (MP3) format and play a CD having recorded thereon a scene photographed by a digital camera or a camcorder or a JPEG file of a personal computer (PC).

To play an MP3 disc, the open/close button 320 of the remote controller 300, as shown in FIG. 3, is pressed to open the disc tray 109, as shown, for example, in FIG. 1A, and the MP3 disc is loaded. Then an MP3 menu screen appears as shown on a screen 531 of FIG. 5N and the playback starts. If the cursor buttons 342, 343, 344, and 345 are pressed to select an album in the stop mode and the enter button 346 is pressed, a list of tracks included in the album appears.

To change the album, the cursor buttons 342, 343, 344, and 345 are pressed to select a new album in the stop mode and the enter button 346 is pressed. Then an MP3 menu screen appears as shown on a screen 532 of FIG. 5N. To select another album and track, those steps are repeated two or three times. To stop the MP3 disc playback, the stop button 339 is pressed.

To play a JPEG disc, the open/close button 320 is pressed to open the disc tray and the JPEG disc is loaded. Then playback starts automatically and each image is shown for 5 seconds before another image is displayed. Each time the up cursor button 343 is pressed during playback, the image is flipped vertically. Each time the down cursor button 345 is pressed during playback, the image is flipped horizontally. Each time the left cursor button 342 is pressed during playback, the image is rotated 90° counterclockwise. Each time the right cursor button 344 is pressed during playback, the image is rotated 90° clockwise.

(15) DivX Playback

A digital Internet video express (DivX) is a video file format developed by Microsoft and based on MPEG4 compression technology, and is used to provide audio, video, and animation data over the Internet in real-time. MPEG4 is used for video encoding and MP3 is used for audio encoding, so that users can watch a movie at near DVD-quality video and audio.

For skip forward/backward, the button 338 or 341 is pressed during playback. If there are 2 files or more in the disk 10, a movement is made to the next file whenever the button 338 is pressed and a movement is made to the previous file whenever the button 341 is pressed.

For fast playback, the button 338 or 341 is held down during playback. Each time either button is pressed, the playback speed or the reverse playback speed changes in the order of 2×→4×→8×→32×→Normal.

For a 5 minute skip function, the left cursor button 342 or the right cursor button 344 is pressed during playback. Each time the right cursor button 344 is pressed, playback skips 5 minutes forward. Each time the left cursor button 342 is pressed, playback skips 5 minutes back.

For a zoom function, the zoom button 330 is pressed. Each time the zoom button 330 is pressed, a user's selection switches between "ZOOM ON" and "ZOOM OFF". The cursor buttons 342, 343, 344, and 345 are pressed to move to an area to be enlarged.

For subtitle display, the subtitle select button 308 is pressed. Each time the subtitle select button 308 is pressed, a user's selection switches between "SUBTITLE ON (1/1, 1/2, . . . )" and "SUBTITLE OFF". If the disc 10 has only one subtitle file, the subtitle is played automatically. If the disc 10 has at least two subtitle files, the enter button 346 is pressed in the stop mode to select the desired subtitle on the TV screen and the enter button 346 is pressed.

For audio display, the audio select button 328 is pressed. Each time the audio select button 328 is pressed, a user's selection switches between "AUDIO ON (1/1, 1/2, . . . )" and "Not applicable".

Figure 6:
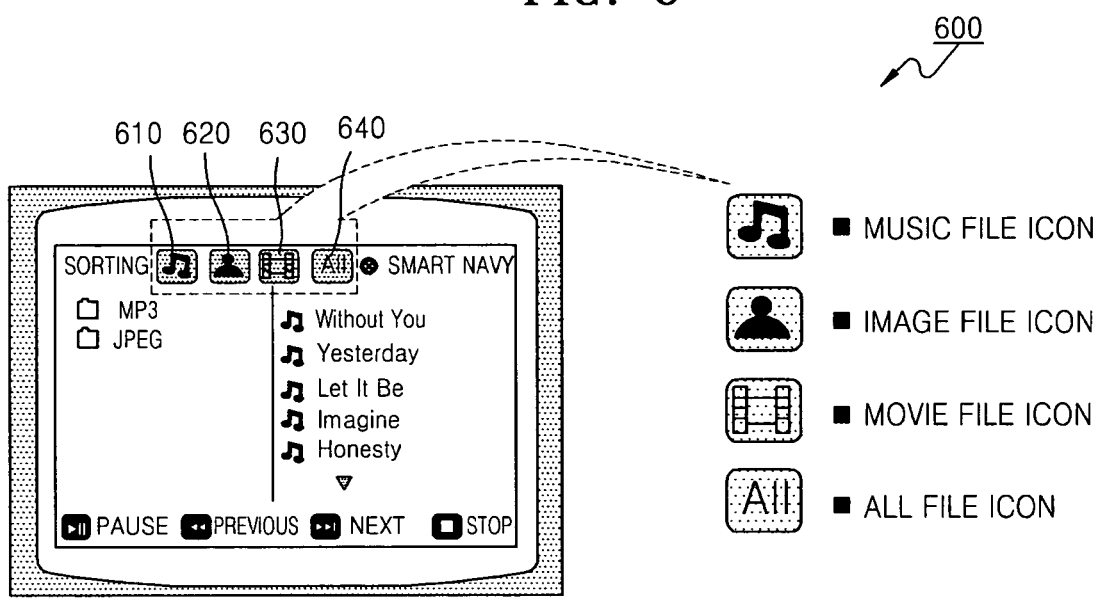
FIG. 6 is a view for explaining a USB HOST playback mode according to an example embodiment of the present invention.

FIG. 6 is a view for explaining an example USB HOST playback mode according to an embodiment of the present invention.

Users can enjoy media files such as pictures, moving pictures, and music files stored in a storage device such as an MP3 player, a USB memory, or a digital camera in high quality video with high quality sound by connecting the storage device to a USB connection terminal of the digital multimedia playback apparatus according to an example embodiment of the present invention. Before the playback, the TV/DVD receiver button 319 of the remote controller 300, as shown in FIG. 3, is pressed to select a TV mode and a connected external input (video or DVD/component) is selected using the TV/external input button 321. A DVD receiver mode is selected using the TV/DVD receiver button 319.

A USB device is connected to the USB connection terminal in the rear panel of the digital multimedia playback apparatus and a USB mode is selected by pressing the function button 115 in the front panel of the digital multimedia playback apparatus as shown, for example, in FIG. 1A, or the external device button 322 of the remote controller 300, as shown, for example, in FIG. 3. "USB" appears on the display screen and then disappears. As shown in FIG. 6, a USB sorting screen 600 appears on the TV screen and the stored file is played. To stop playback, the stop button 339 is pressed. To play the file on the USB menu screen, the cursor buttons 342, 343, 344, and 345 are pressed in the stop mode and a desired icon is selected from the top of the menu.

To listen to a music file, a music file icon 610 is selected, which results in only music files being separately displayed. To view an image file, an image file icon 620 is selected, which results in only image files being separately displayed. If a movie file icon 630 is selected, only movie files are separately displayed. If an all file icon 640 is selected, all files are displayed.

For skip forward/back, the button 338 or 341 is pressed during playback. If there are more than two files on the disc, the next file is selected each time the button 338 is pressed and the previous file is selected each time the button 341 is pressed. For fast playback, the button 338 or 341 is held down. Each time the button 338 or 341 is held down, the forward playback speed or reverse playback speed changes in the order of 2×→4×→8×→32×→Normal.

The digital multimedia playback apparatus according to an example embodiment of the present invention provides a user interface for preventing damage to a memory stored in the USB device. If the user presses the stop button 339 two times consecutively, the screen displays, for example, "REMOVE→USB" to show a message requesting removal of a USB cable. The user can safely disconnect the digital multimedia playback apparatus with the external device by removing the USB cable after checking the message.

In the digital multimedia playback apparatus according to the present invention, 1) Setting Speaker, 2) Setting Delay Time, 3) Using Test Tone, 4) Setting D.R.C, 5) Setting Audio Quality, 6) Setting AV-SYNC, 7) Setting Language, 8) Setting TV Screen Type, 9) Setting Rating Level, 10) Setting Wallpaper, 11) Setting DVD Playback Mode, and 12) Setting SACD Playback Mode are available in a setting mode.

1) Setting Speaker: This function is used to automatically adjust a signal output from speakers and a frequency response according to the configuration of the speakers and whether the speakers are used or not.

2) Setting Delay Time: When all the speakers cannot be the same distance from a listening position, the arrival times of audio signals output from the center speaker and surround speakers can be adjusted according to the listening position.

3) Using Test Tone: This function is used to check whether each speaker is correctly connected and there is no problem or to adjust a level for each speaker.

4) Setting D.R.C: This function is used to enjoy Dolby Digital sound when a user watches movies at low volume at night.

5) Setting Audio Quality: This function is used to adjust balance and level for each speaker.

6) Settinq AV-SYNC: This function is used to adjust an audio delay time to match a video because the video and audio may be out of synchronization if connected to a digital TV.

7) Setting Language: This function is used to set a setting screen language, a disc menu language, an audio language, and a subtitle language to desired languages.

8) Setting TV Screen Tyne: This function is used to adjust a TV aspect ratio (screen size) according to the type of TV (a wide screen TV or a standard 4:3 TV).

9) Setting Rating Level: This function is used to set a rating level with respect to violent or adult discs in order to prevent children from viewing the discs. Once the desired rating level is selected, a disc with a rating level that is higher than the selected rating level cannot be played.

10) Setting Wallpaper: This function is used to set a desired image as a wallpaper during playback of a JPEG, DVD, or VCD.

11) Setting DVD Playback Mode: Some DVD-Audio discs contain DVD-Video as well as DVD-Audio. Thus, a DVD-Video mode is set to play the DVD-Video portion of the DVD-Audio disc.

12) Setting SACD Playback Mode: This function is used to play SACDs, which are manufactured in a hybrid disc format, in a CDDA mode instead of an SACD mode.

Figure 7:
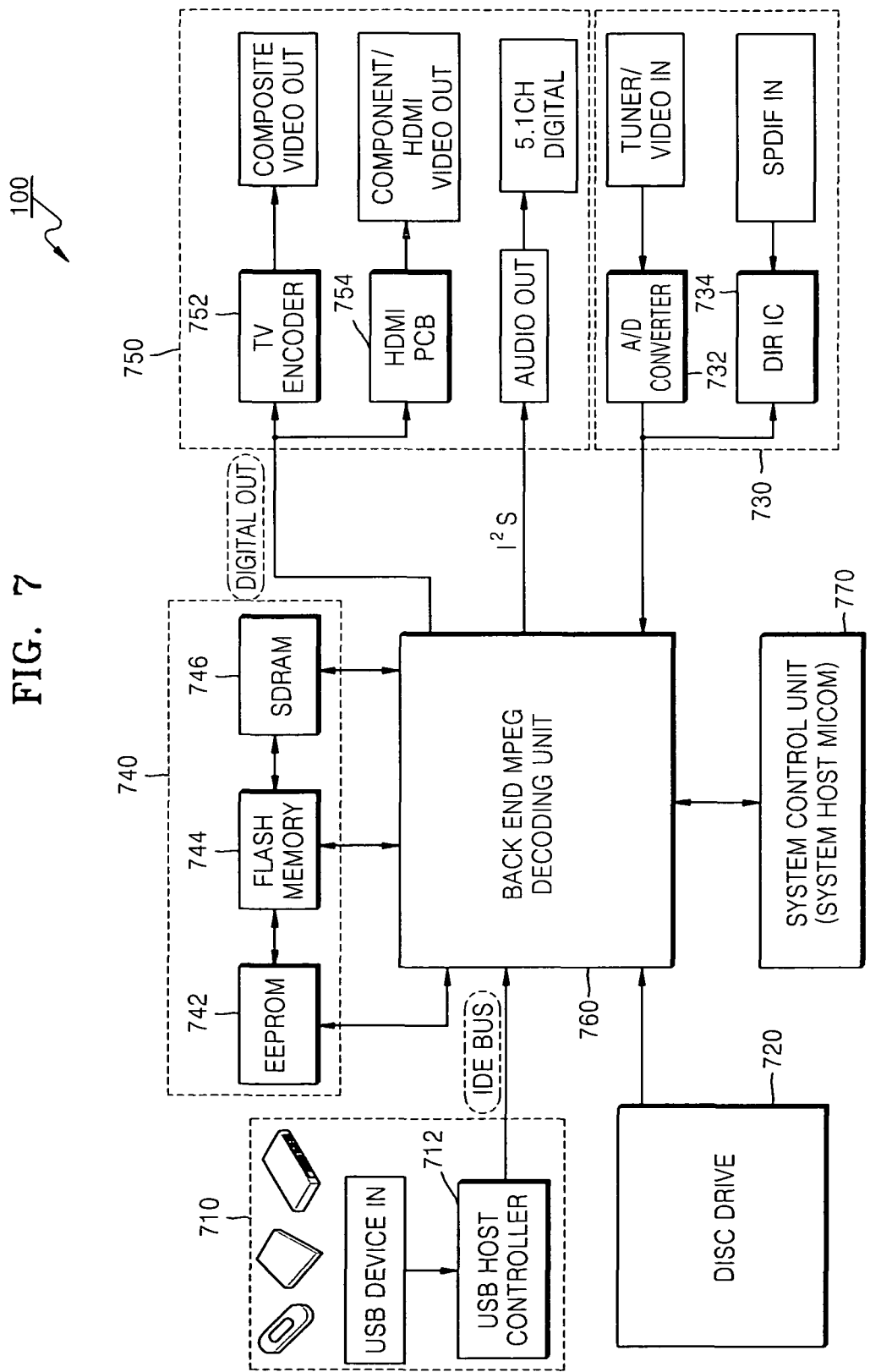
FIG. 7 is a block diagram of a digital multimedia playback apparatus according to an example embodiment of the present invention.

Turning now to FIG. 7, a block diagram of a digital multimedia playback apparatus according to an example embodiment of the present invention is shown. The digital multimedia playback apparatus 100 includes a communication line control unit 710, a disc drive 720, an external signal reception unit 730, a storage unit 740, an output unit 750, a decoding unit 760, and a system control unit 770.

The communication line control unit 710 controls a USB device connected through a communication line. An external device such as an external memory or an MP3 player is connected to the communication line control unit 710 through a communication line such as a USB cable. A USB host controller 712 included in the communication line control unit 710 delivers data stored in the external device to the decoding unit 760.

The disc drive 720 drives a disc 10 loaded in the digital multimedia playback apparatus 100 to read data from the disc 10 and delivers the read data to the decoding unit 760 through a radio frequency (RF) amplifier (not shown).

The external signal reception unit 730 includes an audio-to-digital (A/D) converter 732 and a DIR IC 734 to receive an analog audio signal and a digital audio signal respectively and deliver the analog audio signal and the digital audio signal to the decoding unit 760. The A/D converter 732 converts an analog audio signal received from the external device into a digital audio signal, delivers the digital audio signal to the decoding unit 760, and controls the signal level and switching during the delivery. The DIR IC 734 converts a digital audio signal received from the external device through a Sony/Philips Digital Interface (SPDIF) cable into an audio transmission format called 12S and delivers the converted signal to the decoding unit 760.

The storage unit 740 stores program information required for control of the digital multimedia playback apparatus and digital multimedia contents. Such a storage unit 740 may include an electrically erasable programmable read-only memory (EEPROM) 742, a flash memory 744, and a synchronous dynamic random access memory (SDRAM) 746. The EEPROM 742 stores information that has to be memorized in the power off state, e.g., setting information. The flash memory 744 stores program information required for controlling the decoding unit 760 and multimedia contents. The SDRAM 746 is a storage space for temporary backup of various data. To upgrade programs for controlling the system, an upgrade program may be downloaded in the flash memory 744 from the external device connected through the communication line. Data stored in the EEPROM 742 and the flash memory 744 remains in the power off state and data stored in the SDRAM 746 does not remain in the power off state.

The output unit 750 receives multimedia data from the decoding unit 760 and outputs the multimedia data to a display device such as a TV and an audio output device. The output unit 750 includes a TV encoder 752 and an HDMI PCB unit 754. The TV encoder 752 is a video D/A converter that converts a digital video signal output from the decoding unit 760 to a TV having no digital input terminal into a composite analog signal. The HDMI PCB unit 754 converts a digital video signal output from the decoding unit 760 to a TV having an HDMI input terminal into an HDMI transmission format for transmission.

The decoding unit 760 performs MPEG decoding on digital multimedia data from the USB device connected through the communication line and the storage unit 740 and outputs the decoded digital multimedia data to the output unit 750. The decoding unit 760 also receives an audio signal or a video signal from the external signal reception unit 730 and outputs the received signal to the output unit 750.

The system control unit 770 controls the overall operation of the digital multimedia playback apparatus 100 and communicates with the decoding unit 760 using host/slave protocols. The system control unit 770 may control the decoding unit 760 to show a message requesting removal of the communication line through the output unit 750 when a playback stop signal is consecutively input through a user interface. The system control unit 770 also controls the decoding unit 760 to navigate contents stored in the external device connected through the communication line, to provide a list of the found contents through the user interface, and to play first found contents among the found contents. In order to periodically provide information about whether the external device is connected through the communication line, the system control unit 770 may control the decoding unit 760 to show a message indicating that the communication line is not sensed through the output unit 750 if the communication line is not sensed.

The system control unit 770 also analyzes a user input signal and controls the decoding unit 760 to control playback, to provide an additional function, or to stop playback and provide a navigation screen based on the analyzed user input signal.

When the decoding unit 760 outputs a list of the found contents to the output unit 750 to provide a sorting function for efficiently providing the list to a user, the system control unit 770 also controls the decoding unit 760 to provide content type hot icons for providing through the user interface lists of the found contents sorted according to content type and to provide through the user interface a list of contents corresponding to one of the icons selected based on a user selection signal input.

Once the disc 10 is loaded in the disc drive 720, the system control unit 770 senses the loaded disc 10 and controls the decoding unit 760 to decode contents that is first read from the sensed disc 10 and to output the decoded contents to the output unit 750. Thereafter, the system control unit 770 analyzes a user input signal and controls the decoding unit 760 to control playback, to provide an additional function, or to stop playback and provide a navigation screen based on the analyzed user input signal.

When contents in an MPEG playback format or a DivX playback format are read from the disc 10, the system control unit 770 may control the decoding unit 760 to provide a list of the MPEG playback format or the DivX playback format contents stored in the disc 10 through the user interface. Thus, the user interface provided when the MPEG playback format or the DivX playback format contents are read from the disc 10 may be the same as the user interface that provides the multimedia contents stored in the external device connected through the communication line.

Figure 8:
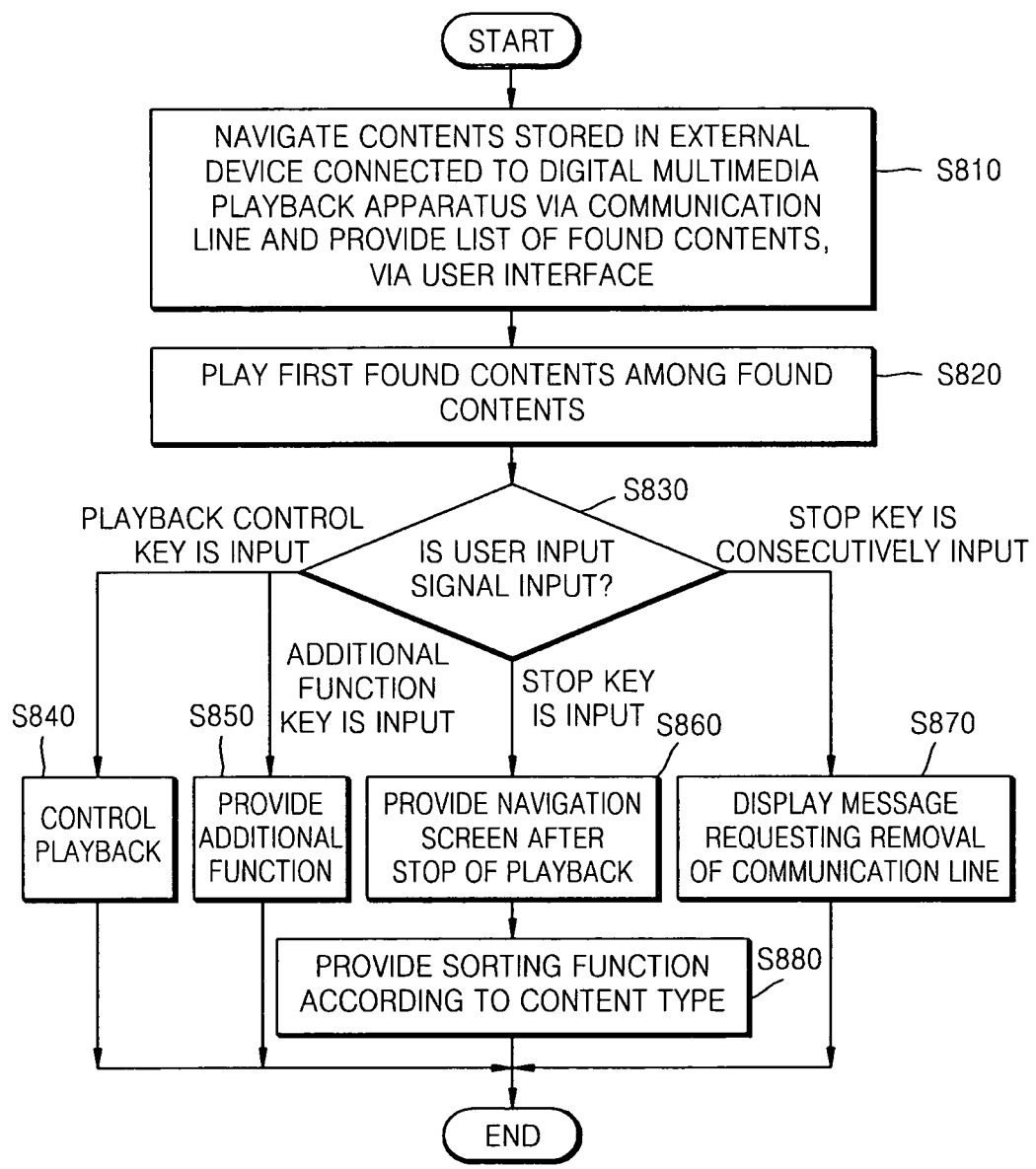
FIG. 8 is a flowchart illustrating a digital multimedia playback method according to an example embodiment of the present invention.

FIG. 8 is a flowchart illustrating a digital multimedia playback method according to an example embodiment of the present invention.

In the digital multimedia playback method in which contents stored in an external device connected to a digital multimedia playback apparatus 100, via a communication line, the contents stored in the external device are navigated and a list of the found contents is provided, via a user interface at block S810. At block S820, first found contents among the found contents are played. A user input signal input via the user interface is analyzed at block S830 and playback is controlled at block S840, an additional function is provided at block S850, or playback is stopped and a navigation screen is provided at block S860 according to the analyzed user input signal. If a playback stop signal is consecutively input via the user interface, a message requesting removal of the communication line is displayed on the user interface at block S870.

Furthermore, the digital multimedia playback apparatus 100 may be programmed to periodically check whether an external device is connected via the communication line and a message indicating that the communication line is not detected may be provided via the user interface, if the communication line is not detected.

At block S880, content type hot icons for providing lists of the found contents sorted according to content type are provided via the user interface and a list of contents corresponding to one of the icons selected based on a user selection signal input via the user interface is provided.

An additional function at block S850 includes at least one of an information display function for checking information during playback, a time display function for checking the total and remaining time of a title or chapter being played, an audio and subtitle language selection function for changing an audio language or a subtitle language during playback, a moving directly to scene/song function for moving directly to a desired title, chapter, time, or track, a segment repeat playback function for repeating playback of a chapter, a title, or a group, a screen enlarge/screen fit function for enlarging a screen or fitting a video to a TV screen, an angle function for viewing the same scene from different angles, and a bonus group function for restricting playback of the disc.

A playback control function at block S840 includes at least one of a skip forward/backward function for moving to the previous or next chapter, track or scene, a fast playback function for fast playback, a slow playback function for slow playback, and a step function for frame-by-frame playback. Once a user input signal requesting a function included in the playback control function is input through the user interface, digital multimedia contents stored in the disc are played according to the user input signal.

The digital multimedia playback method may further include sensing if the disc is loaded to play contents that have been first read from the sensed disc, parsing a user input signal if the user input signal is input, controlling playback, providing an additional function, or stopping playback according to the analyzed user input signal. If MPEG playback format or DivX playback format contents are read from the disc, the digital multimedia playback method may further include providing a list of the contents through the user interface.

The digital multimedia playback method according to the present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

According to the present invention, a user interface is provided for allowing a user to conveniently play various multimedia contents. In addition, an external device is connected to a digital multimedia playback apparatus via a communication line such that multimedia contents stored in the external device can be played.

According to the present invention, when the communication line connected to the digital multimedia playback apparatus is removed, a user interface for stably removing the communication line without causing damage to the digital multimedia playback apparatus can be provided.

Various components of the digital multimedia playback apparatus, as shown in FIG. 1 and FIG. 7, such as the communication line control unit 710, the external signal reception unit 730, the output unit 750, the backend MPEG decoding unit 760 and the system control unit 770 can be integrated into a single control unit, or alternatively, can be implemented in software or hardware, such as, for example, a field programmable gate array (FPGA) and an application specific integrated circuit (ASIC). As such, it is intended that the processes described herein be broadly interpreted as being equivalently performed by software, hardware, or a combination thereof. These software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Furthermore, the software modules as described can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. A digital multimedia playback method comprising:
   navigating, by a digital multimedia playback apparatus, multimedia contents stored in an external device connected to the digital multimedia playback apparatus, via a communication line; and
   playing a first navigated content when the first navigated content exists among the multimedia contents,
   wherein, when a playback stop signal is consecutively input via a user interface, a message requesting removal of the communication line is displayed on the user interface.

2. The digital multimedia playback method of claim 1, further comprising:
   periodically checking if the external device is connected to the digital multimedia playback apparatus via the communication line; and
   providing a message indicating that the communication line is not sensed via a user interface when the communication line is not sensed.

3. The digital multimedia playback method of claim 1, further comprising providing a list of the navigated multimedia contents via a user interface,
   wherein the providing of the list of the navigated multimedia contents via the user interface comprises:
   providing via the user interface, content type hot icons for providing lists of the navigated multimedia contents sorted according to content type; and
   providing a list of the navigated multimedia contents corresponding to one of the multimedia content type hot icons selected based on a user selection signal input via the user interface.

4. The digital multimedia playback method of claim 1, further comprising:
   sensing if a disc is loaded and decoding multimedia contents that have been first read from the disc;
   when a user input signal is input via a user interface, analyzing the input user input signal; and
   controlling playback, providing the additional function, or stopping playback based on the analyzed user input signal,
   wherein, when multimedia contents in a moving picture experts group (MPEG) playback format or a digital Internet video express (DivX) playback format are read from the disc, a list of the MPEG playback format or DivX playback multimedia contents stored in the disc is provided via the user interface.

5. The digital multimedia playback method of claim 4, further comprising providing a list of the navigated multimedia contents via a user interface,
   wherein the providing of the list of the navigated multimedia contents via the user interface comprises:
   providing via the user interface, multimedia content type hot icons for providing lists of the navigated multimedia contents sorted according to multimedia content type; and
   providing a list of the navigated multimedia contents corresponding to one of the multimedia content type hot icons selected based on a user selection signal input via the user interface.

6. The digital multimedia playback method of claim 1, further comprising controlling playback, providing an additional function, or stopping playback according to a user input,
   wherein the additional function comprises at least one of an information display function for checking information during playback, a time display function for checking the total and remaining time of a title or chapter being played, an audio and subtitle language selection function for changing an audio language or a subtitle language during playback, a moving directly to scene/song function for moving directly to a desired title, chapter, time, or track, a segment repeat playback function for repeating playback of a chapter, a title, or a group, a screen enlarge/screen fit function for enlarging a screen or fitting a video to a TV screen, an angle function for viewing the same scene from different angles, and a bonus group function for restricting playback of the disc.

7. The digital multimedia playback method of claim 6, wherein the controlling of the playback comprises providing at least one of a skip forward/backward function for moving to the previous or next chapter, track or scene, a fast playback function for fast playback, a slow playback function for slow playback, and a step function for frame-by-frame playback.

8. A digital multimedia playback apparatus comprising:
a navigating unit configured to navigate, by a digital multimedia playback apparatus, multimedia contents stored in an external device connected to the digital multimedia playback apparatus, via a communication line; and
a playing unit configured to play a first navigated content when the first navigated content exists among the multimedia contents,
wherein, when a playback stop signal is consecutively input via a user interface, a message requesting removal of the communication line is displayed on the user interface.

9. The digital multimedia playback apparatus of claim 8, further comprising:
a system control unit for periodically checking if the external device is connected to the digital multimedia playback apparatus via a communication line; and
an output unit for providing a message indicating that the communication line is not sensed via a user interface when the communication line is not sensed.

10. The digital multimedia playback apparatus of claim 8, wherein the navigating unit provides a list of the navigated multimedia contents via a user interface,
wherein, the navigating unit provides, via the user interface, multimedia content type hot icons for providing lists of the navigated multimedia contents sorted according to multimedia content type, and provides a list of the navigated multimedia contents corresponding to one of the multimedia content type hot icons selected based on a user selection signal input via the user interface.

11. The digital multimedia playback apparatus of claim 9, wherein the system control unit senses if a disc is loaded and decodes multimedia contents that have been first read from the disc, and analyzes a user input signal when the user input signal is input via a user interface, and the playback control unit controls playback, provides the additional function, or stops playback based on the analyzed user input signal, wherein, when multimedia contents in a moving picture experts group (MPEG) playback format or a digital Internet video express (DivX) playback format are read from the disc, a list of the MPEG playback format or DivX playback format multimedia contents stored in the disc is provided via the user interface.

12. The digital multimedia playback apparatus of claim 11, wherein the navigating unit provides a list of the navigated multimedia contents via a user interface,
wherein the navigating unit provides, via the user interface, multimedia content type hot icons for providing lists of the navigated multimedia contents sorted according to multimedia content type; and
provides a list of the navigated multimedia contents corresponding to one of the multimedia content type hot icons selected based on a user selection signal input via the user interface.

13. The digital multimedia playback apparatus of claim 8, further comprising a playback control unit configured to control playback, provide an additional function, or stop playback according to a user input,
wherein the additional function comprises at least one of an information display function for checking information during playback, a time display function for checking the total and remaining time of a title or chapter being played, an audio and subtitle language selection function for changing an audio language or a subtitle language during playback, a moving directly to scene/song function for moving directly to a desired title, chapter, time, or track, a segment repeat playback function for repeating playback of a chapter, a title, or a group, a screen enlarge/screen fit function for enlarging a screen or fitting a video to a TV screen, an angle function for viewing the same scene from different angles, and a bonus group function for restricting playback of the disc.

14. The digital multimedia playback apparatus of claim 13, wherein the playback control unit provides at least one of a skip forward/backward function for moving to the previous or next chapter, track or scene, a fast playback function for fast playback, a slow playback function for slow playback, and a step function for frame-by-frame playback.

15. A digital multimedia playback apparatus comprising:
a communication line control unit arranged to control an external device connected via a communication line;
a disc drive configured to drive a disc so as to play multimedia data stored in the disc;
an external signal reception unit arranged to receive a signal including multimedia multimedia contents from the external device connected via a predetermined cable;
a decoding unit configured to decode multimedia data received from the communication line control unit, the disc drive, and the external signal reception unit;
a storage unit configured to store system control programs and the multimedia multimedia contents decoded by the decoding unit;
an output unit configured to output the decoded multimedia multimedia contents; and
a system control unit arranged to-control the communication line control unit, the disc drive, the external signal reception unit, the decoding unit, and the output unit according to a user input signal,
wherein, when a playback stop signal is consecutively input via the user interface, the system control unit controls the decoding unit to generate a message requesting removal of the communication line via the output unit,
wherein, the communication line control unit comprises a communication line host controller for transmitting data stored in the external device to the decoding unit,
wherein the external signal reception unit comprises at least one of an analog-to-digital (A/D) converter for receiving an analog audio signal from the external device connected via the predetermined cable, converting the analog audio signal into a digital audio signal, delivering the digital audio signal to the decoding unit, and controlling signal level and switching during the delivery and a DIR IC for delivering a digital audio signal input through a Sony/Philips Digital Interface (SPDIF) cable to the decoding unit, and
wherein the output unit comprises at least one of a TV encoder for converting a digital video signal output from the decoding unit into a composite analog signal, delivering the composite analog signal to a television (TV) having no digital input terminal and a high-definition multimedia interface (HDMI) printed circuit board (PCB) unit for converting the digital video signal output from the decoding unit into an HDMI transmission format and transmitting the format converted digital video signal to a TV having an HDMI input terminal.

16. A non-transitory computer-readable recording medium having recorded thereon a program for implementing the digital multimedia playback method of claim 1.

* * * * *